US011982530B2

(12) United States Patent
Visconti et al.

(10) Patent No.: US 11,982,530 B2
(45) Date of Patent: May 14, 2024

(54) SENSOR ARRAY AND METHOD FOR OPERATING A SENSOR ARRAY

(71) Applicant: Robert Bosch GmbH, Stuttgart (DE)

(72) Inventors: Andrea Visconti, Munich (DE); Francesco Diazzi, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 23 days.

(21) Appl. No.: 17/776,070

(22) PCT Filed: Nov. 17, 2020

(86) PCT No.: PCT/EP2020/082361
§ 371 (c)(1),
(2) Date: May 11, 2022

(87) PCT Pub. No.: WO2021/129980
PCT Pub. Date: Jul. 1, 2021

(65) Prior Publication Data
US 2022/0390235 A1  Dec. 8, 2022

(30) Foreign Application Priority Data

Dec. 23, 2019  (DE) .................... 10 2019 220 544.5

(51) Int. Cl.
*G01C 19/5776* (2012.01)
*G01C 19/00* (2013.01)
*G01C 19/5712* (2012.01)

(52) U.S. Cl.
CPC ....... *G01C 19/5712* (2013.01); *G01C 19/005* (2022.01); *G01C 19/5776* (2013.01)

(58) Field of Classification Search
CPC .............. G01C 19/5712; G01C 19/005; G01C 19/5776
See application file for complete search history.

(56) References Cited

U.S. PATENT DOCUMENTS 9,506,757 B2   11/2016  Shaeffer et al.
10,393,552 B1   8/2019  Cazzaniga et al.
(Continued)

FOREIGN PATENT DOCUMENTS

DE    102008054787 A1    6/2010
DE    102010062581 A1    6/2012

OTHER PUBLICATIONS

International Search Report for PCT/EP2020/082361, dated Feb. 25, 2021.

*Primary Examiner* — David J Bolduc
(74) *Attorney, Agent, or Firm* — NORTON ROSE FULBRIGHT US LLP; Gerard A. Messina

(57) ABSTRACT

A sensor array. The sensor array includes a gyroscope device, including: a MEMS gyroscope including a seismic mass which is excitable to carry out oscillations; a driver circuit for exciting and maintaining an oscillating movement of the seismic mass; and a sensing unit. The sensor array further includes a control unit for selecting one of at least two different predefined operating modes of the gyroscope device, at least one sensing operating mode, in which rotation rate sensor signals are detected and/or preprocessed, and at least one stand-by operating mode, in which no rotation rate sensor signals are detected and/or preprocessed, being predefined as operating modes. The sensor array further includes a further sensor device for detecting further sensor signals; and a digital data processing unit for the rotation rate sensor signals and the further sensor signals.

6 Claims, 3 Drawing Sheets

(56) References Cited

U.S. PATENT DOCUMENTS

| | | | |
|---|---|---|---|
| 2013/0099836 A1* | 4/2013 | Shaeffer | H03L 7/0893 |
| | | | 327/147 |
| 2013/0312520 A1* | 11/2013 | Kho | G01C 19/56 |
| | | | 73/504.12 |
| 2013/0340524 A1* | 12/2013 | Maeda | G01P 15/0888 |
| | | | 73/514.02 |
| 2014/0260713 A1* | 9/2014 | Shaeffer | H03L 7/093 |
| | | | 74/5.4 |
| 2015/0185011 A1 | 7/2015 | Beaulaton et al. | |
| 2016/0139176 A1* | 5/2016 | Shirazi | G01C 19/5726 |
| | | | 73/1.38 |
| 2016/0344368 A1* | 11/2016 | Ayazi | G01C 19/5712 |
| 2017/0167876 A1* | 6/2017 | Coronato | G01C 19/5733 |
| 2017/0328712 A1* | 11/2017 | Collin | G01C 19/5726 |
| 2018/0080769 A1* | 3/2018 | Arndt | H03L 7/081 |
| 2021/0108921 A1* | 4/2021 | Diazzi | G01C 19/5712 |

\* cited by examiner

SENSOR ARRAY AND METHOD FOR OPERATING A SENSOR ARRAY

FIELD

The present invention relates to a sensor array, at least including:
- a gyroscope device for detecting rotation rate sensor signals, including:
  - a MEMS gyroscope including a seismic mass which is excitable to carry out oscillations;
  - a driver circuit for exciting and maintaining an oscillating movement of the seismic mass; and
  - a sensing unit;
- a control unit for selecting one of at least two different predefined operating modes of the gyroscope device, at least one sensing operating mode, in which rotation rate sensor signals are detected and/or preprocessed, and at least one stand-by operating mode, in which no rotation rate sensor signals are detected and/or preprocessed, being predefined as operating modes;
- a further sensor device for detecting further sensor signals; and
- a digital data processing unit for the rotation rate sensor signals and the further sensor signals.

The present invention furthermore relates to a method for operating such a sensor array.

BACKGROUND INFORMATION

Conventional MEMS rotation rate sensors, hereafter referred to as gyroscopes for short, are frequently used together with a MEMS acceleration sensor in an inertia measuring unit, for example to enable applications with augmented reality or navigation inside of buildings. In the process, in particular, the stability and accuracy of the output data rate (ODR) plays an important role, i.e., the data rate at which the ascertained data of the gyroscope and/or acceleration sensor are output. In some navigation applications, the absolute position is determined based on the measuring signals of the gyroscope and of the acceleration sensor. For this purpose, a time integration of these measuring signals is carried out. An inaccurate output data rate in this case results in a corresponding inaccuracy of the ascertained position.

Conventional MEMS sensor arrays including a gyroscope and an acceleration sensor include an integrated electronic oscillator, which provides a signal or a frequency for the output data rate of the acceleration sensor. When the gyroscope is switched on, the output data rate or a corresponding clock signal is instead derived from the resonance frequency of the excitation oscillation of the seismic mass of the MEMS gyroscope, which is excited and maintained with the aid of a driver circuit. This clock signal, however, is only available when the gyroscope is in an activated state. With every switch between the clock signal, generated by the integrated electronic oscillator, and the clock signal, generated by the driver circuit, a jump or change in the frequency of the output data rate ODR occurs. In addition, the integrated electronic oscillator has an increased drift as a function of the temperature, compared to the driver circuit.

SUMMARY

In one specific example embodiment, the present invention provides a sensor array, at least including:
- a gyroscope device for detecting rotation rate sensor signals, including:
  - a MEMS gyroscope including a seismic mass which is excitable to carry out oscillations;
  - a driver circuit for exciting and maintaining an oscillating movement of the seismic mass; and
  - a sensing unit;
- a control unit for selecting one of at least two different predefined operating modes of the gyroscope device, at least one sensing operating mode, in which rotation rate sensor signals are detected and/or preprocessed, and at least one stand-by operating mode, in which no rotation rate sensor signals are detected and/or preprocessed, being predefined as operating modes;
- a further sensor device for detecting further sensor signals; and
- a digital data processing unit for the rotation rate sensor signals and the further sensor signals, the driver circuit being operable, corresponding to the different operating modes of the gyroscope device, in different operating modes having different energy consumptions, so that the oscillating movement of the seismic mass is maintained in the at least one sensing operating mode and in at least one stand-by operating mode, the digital data processing unit being configured to provide the digitized rotation rate sensor signals and/or the digitized further sensor signals in the at least one sensing operating mode and in the at least one stand-by operating mode at an output data rate (ODR) which is based on the oscillation frequency of the seismic mass.

In one further specific example embodiment, the present invention provides a method for operating a sensor array, at least including:
- a gyroscope device for detecting rotation rate sensor signals, including:
  - a MEMS gyroscope including a seismic mass which is excitable to carry out oscillations;
  - a driver circuit for exciting and maintaining an oscillating movement of the seismic mass; and
  - a sensing unit;
- a control unit for selecting one of at least two different predefined operating modes of the gyroscope device, at least one sensing operating mode, in which rotation rate sensor signals are detected and/or preprocessed, and at least one stand-by operating mode, in which no rotation rate sensor signals are detected and/or preprocessed, being predefined as operating modes;
- a further sensor device for detecting further sensor signals; and
- a digital data processing unit for the rotation rate sensor signals and the further sensor signals, the driver circuit being operable, corresponding to the different operating modes of the gyroscope component, in different operating modes having different energy consumptions, in particular power consumptions, so that the oscillating movement of the seismic mass is maintained in at least one sensing operating mode and in at least one stand-by operating mode, and an output data rate (ODR) of the digitized rotation rate sensor signals and/or of the digitized further sensor signals provided with the aid of the data processing unit in the at least one sensing operating mode and in the at least one stand-by operating mode being based on the oscillation frequency of the seismic mass.

Output data rate ODR for all sensors of the sensor array is thus based on the oscillating movement of the seismic mass of the MEMS gyroscope, which is maintained regardless of the operating mode of the MEMS gyroscope, namely both in the sensing operating mode, when rotation signals are being detected, and in the stand-by operating mode, when no rotation rate measuring signals are being detected. In this way, an additional oscillator as a clock generator for output data rate ODR may be dispensed with. The seismic mass of the MEMS gyroscope is generally excited to carry out resonance oscillations. This oscillating movement is very frequency-stable. Moreover, the resonance frequency is largely temperature-independent. In this way, an extremely high stability of the output data rate is made possible not only during operation of the MEMS gyroscope, i.e., in the sensing operating mode, but in all operating states. Frequency jumps in the clock signal, and thus in output data rate ODR, when switching between operating states are avoided. Temperature drifts in output data rate ODR are also considerably reduced. Moreover, the energy consumption for maintaining the oscillating movement of the seismic mass of the MEMS gyroscope is kept within limits. The driver circuit is only operated in a high performance mode, having a high energy consumption, in the sensing operating mode. In the stand-by operating mode, a low power mode has proven to be sufficient for the driver circuit for maintaining the oscillating movement of the seismic mass.

In other words, specific example embodiments of the present invention and, in particular, the provision of at least two operating modes having different energy consumptions for the driver circuit of the gyroscope device, provide a simple, flexible, and cost-saving, as well as energy-saving, sensor array, which has a high accuracy and stability of the output data rate.

Further features, advantages and further specific example embodiments of the present invention are described hereafter or become apparent thereby.

According to one advantageous refinement of the present invention, the control unit is configured to directly activate the sensing unit and/or the driver circuit of the gyroscope device to specify an operating mode. With this, a control of the sensing unit and/or of the driver circuit is made possible in a simple and flexible manner.

According to one further advantageous refinement of the present invention, the driver circuit is designed to provide to the digital data processing unit a clock signal including pieces of information about the oscillation frequency of the seismic mass. The advantage of this is that the digital data processing unit is able to provide data of the sensing unit in a particularly accurate and stable manner.

According to one further advantageous refinement of the present invention, the driver circuit includes at least two separate driver circuits, with the aid of which different operating modes of the driver circuit may be provided. One of the advantages achieved thereby is that in this way separate operating modes may be reliably provided. In other words, in this way each operating mode of the driver circuit may be provided by a separate driver circuit. In this way, essentially at least one second circuit is provided within the driver circuit, whose goal it is to maintain the gyroscope device, more precisely an oscillation of the seismic mass of the gyroscope device, using a minimum of energy. This second circuit is thus utilized when the circuit for the proper operation of the gyroscope device, this being the sensing operating mode, is switched off, i.e., data of the gyroscope device are not required. The clock signals of the driver signal circuits may be provided via separate interfaces. The control unit may be designed to select the corresponding interface.

According to one further advantageous refinement of the present invention, the further sensor device includes a MEMS acceleration sensor, a magnetometer, a pressure sensor, a gas sensor and/or a moisture sensor. An advantage of this is a simple implementation of the sensor device for a wide variety of applications.

It shall be understood that the above-mentioned features and those still to be described hereafter may be used not only in the particular described combination, but also in other combinations, or alone, without departing from the scope of the present invention.

Preferred embodiments and specific embodiments of the present invention are shown in the figures and are described in greater detail in the following description, identical reference numerals referring to identical or similar or functionally equivalent components or elements.

DETAILED DESCRIPTION OF EXAMPLE EMBODIMENT

Figure 1:
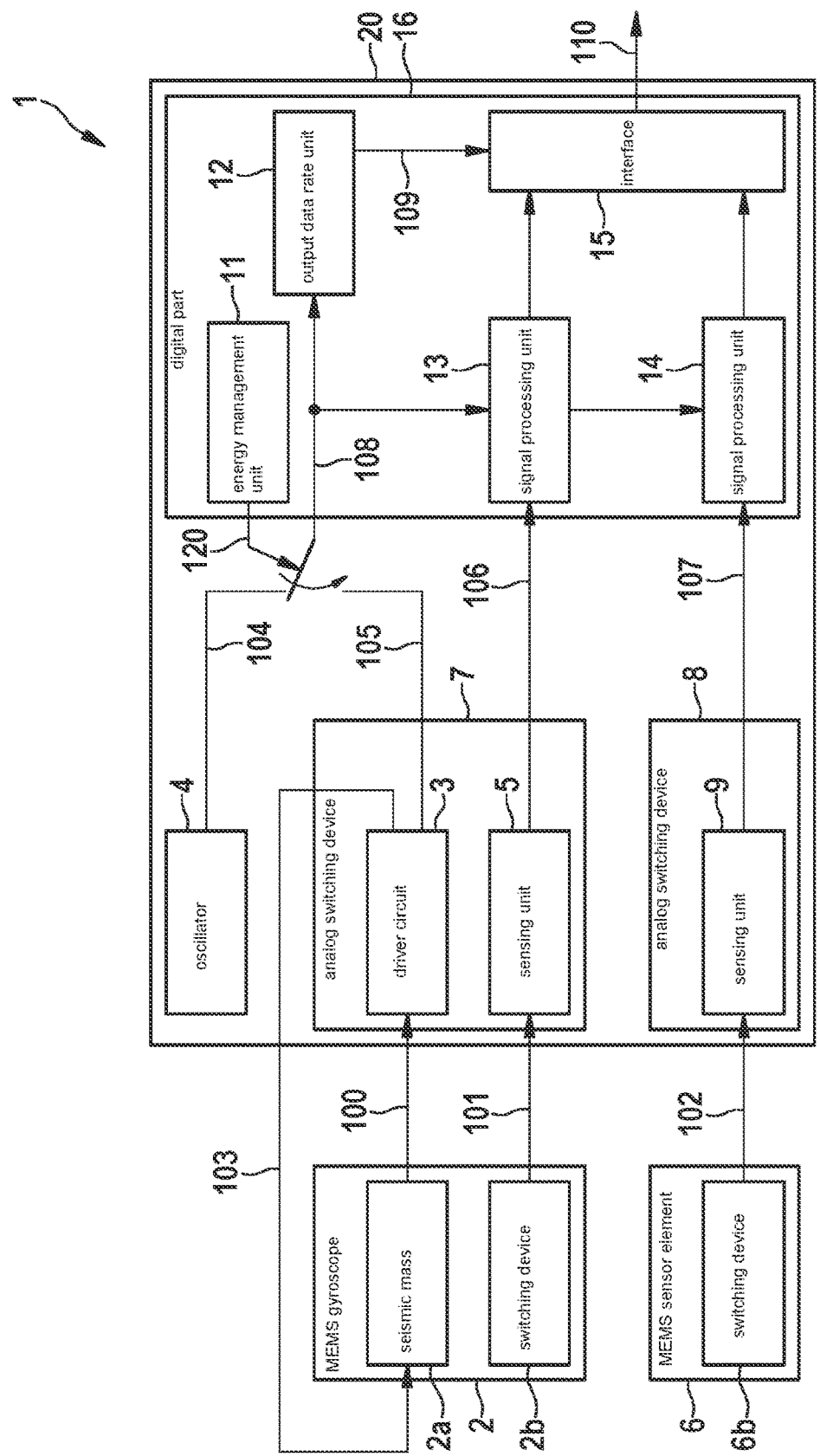
FIG. 1 shows a conventional MEMS sensor array.

FIG. 1 shows a conventional MEMS sensor array 1 including a gyroscope device for detecting rotation rate sensor signals and including a further sensor device in the form of an acceleration sensor. The gyroscope device includes a MEMS gyroscope 2 including a seismic mass 2a, which is excitable to carry out oscillations, and an analog switching device 7. This analog switching device 7 includes a driver circuit 3 for exciting and maintaining an oscillating movement of seismic mass 2a, and a sensing unit 5 for reading out gyroscope measuring signals 101 and for converting these measuring signals 101 into an analog electrical signal 106.

The movement of seismic mass 2a is detected in the form of a position signal 100 and supplied to driver circuit 3. Position signal 100 supplies pieces of information about the amplitude and frequency of the oscillating movement of seismic mass 2a. Based on these pieces of information, driver circuit 3 generates a driver signal 103 for driving and maintaining a defined oscillating movement of seismic mass 2a.

The deflection of the oscillating seismic mass 2a along one spatial axis, or also multiple spatial axes, caused by a rotary movement of the gyroscope device, is detected with the aid of a suitable switching device 2b of MEMS gyroscope 2, for example capacitively. This gyroscope measuring signal 101 is then converted with the aid of sensing unit 5 into an analog electrical gyroscope signal 106, for example with the aid of a capacitance-to-voltage converter.

The acceleration sensor also encompasses a MEMS sensor element 6 including at least one deflectable structural element. The deflection of this structural element along one spatial axis, or also multiple spatial axes, caused by an acceleration, is detected with the aid of a suitable switching device 6b, for example capacitively or piezo-resistively. The acceleration sensor also encompasses an analog switching device 8 including a sensing unit 9 for reading out and converting this measuring signal 102 into an analog electrical acceleration signal 107, for example with the aid of a capacitance-to-voltage converter.

Analog switching devices 7 and 8 of the gyroscope device and of the acceleration sensor form the analog part of an electronic read-out circuit 20 of sensor array 1 shown here. Digital part 16 of this read-out circuit 20 encompasses an energy management unit 11 as a control unit, an output data rate unit 12 for generating an output data rate ODR, a respective signal processing unit 13 and 14 for analog electrical gyroscope signal 106 and acceleration signal 107, as well as an interface 15 for the output of sensor data 110.

Energy management unit 11 specifies the operating mode of the gyroscope device, here either a sensing operating mode, in which rotation rate sensor signals are being detected, or an inactive operating mode, in which the seismic mass is not being driven, and also no rotation rate signals are being detected. For the sake of clarity, the illustration of the signal paths for the corresponding activation of the individual components of the gyroscope device was dispensed with here.

Read-out circuit 20 of the sensor array shown in FIG. 1 finally also includes an oscillator 4, which generates a clock signal 104. With the aid of a switch 120, which is activated via energy management unit 11, output data rate unit 12 and signal processing units 13, 14 are selectively supplied with this oscillator clock signal 104 or a clock signal 105 which was generated by driver circuit 3 of the gyroscope device based on position signal 100. Energy management unit 11 selects the switch position of switch 120 corresponding to the operating mode of the gyroscope device. In the sensing operating mode, the oscillating seismic mass 2a serves as a clock generator for sensor array 1. In the inactive operating mode, i.e., when the seismic mass is not being driven and therefore also cannot act as a clock generator, oscillator 4 is connected and then serves as a clock generator for sensor array 1. In both cases, a clock signal 108 is thus available, which is supplied to signal processing units 13 and 14 and may be used, for example, within the scope of the digitization of the analog sensor signals 101, 102. Clock signal 108 is furthermore supplied to output data rate unit 12. Based on clock signal 108, this unit generates the current output data rate ODR 109 for interface 15 so that the output of sensor data 10 takes place at this output data rate 109. Fluctuations and instabilities of clock signal 108 thus directly affect output data rate 109 of sensor array 1.

Figure 2:
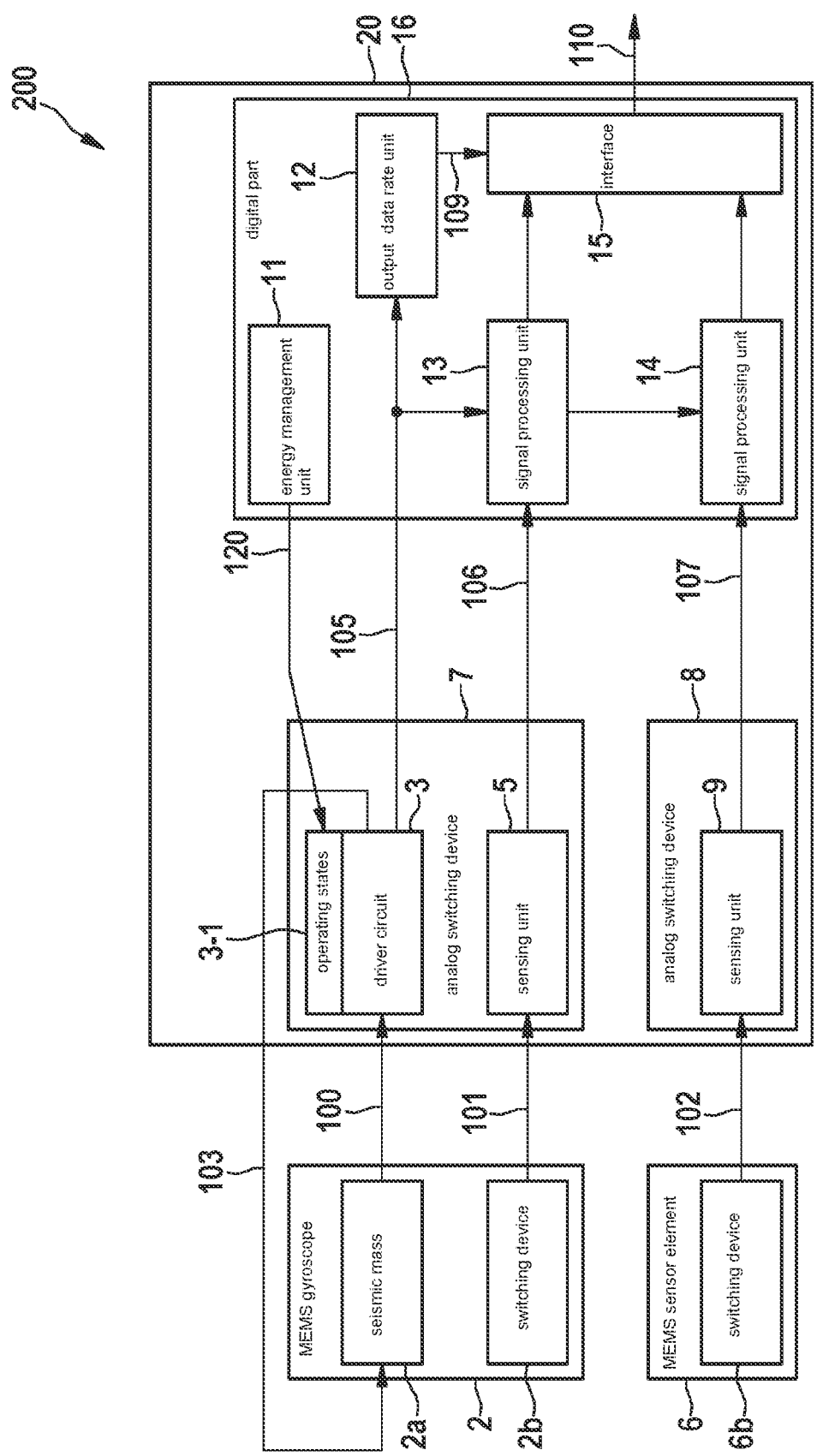
FIG. 2 shows a MEMS sensor array according to one specific example embodiment of the present invention.

FIG. 2 shows a MEMS sensor array 200 according to one specific example embodiment of the present invention. In contrast to MEMS sensor array 1 according to FIG. 1, no separate electronic oscillator 4 is present as a clock generator in MEMS sensor array 200 shown here. Here, the oscillator of the gyroscope device, i.e., seismic mass 2a together with driver circuit 3, always serves as the clock generator for all components of sensor array 200. For this purpose, the driver circuit maintains the oscillating movement of seismic mass 2a, and in particular regardless of the operating mode of the gyroscope device. Driver circuit 3 of the gyroscope device according to this specific embodiment of the present invention is designed in such a way that it may be operated in two operating states 3-1 which differ in their energy consumptions, i.e., in a low energy operating mode for the stand-by operating mode, in which no rotation rate signals of MEMS gyroscope 2 are to be detected, and in a high energy operating mode for the sensing operating mode, in which rotation rate signals of MEMS gyroscope 2 are to be detected. In both operating modes, driver circuit 3 generates a driver signal 103 for driving seismic mass 2a of the MEMS gyroscope device, which ensures a frequency-stable oscillating movement of seismic mass 2a. Based on driver signal 103, a clock signal 105 is generated as a system clock for sensor array 200. The specification or selection of operating mode 3-1 for driver circuit 3 by switch 120 is, in turn, taken over by energy management unit 11, together with the specification of an operating mode 3-1 for the gyroscope device. A change in operating state 3-1 from the stand-by operating mode into the sensing operating mode, or vice versa, thus has no effect on clock signal 105 and on output data rate ODR 109 here.

Figure 3:
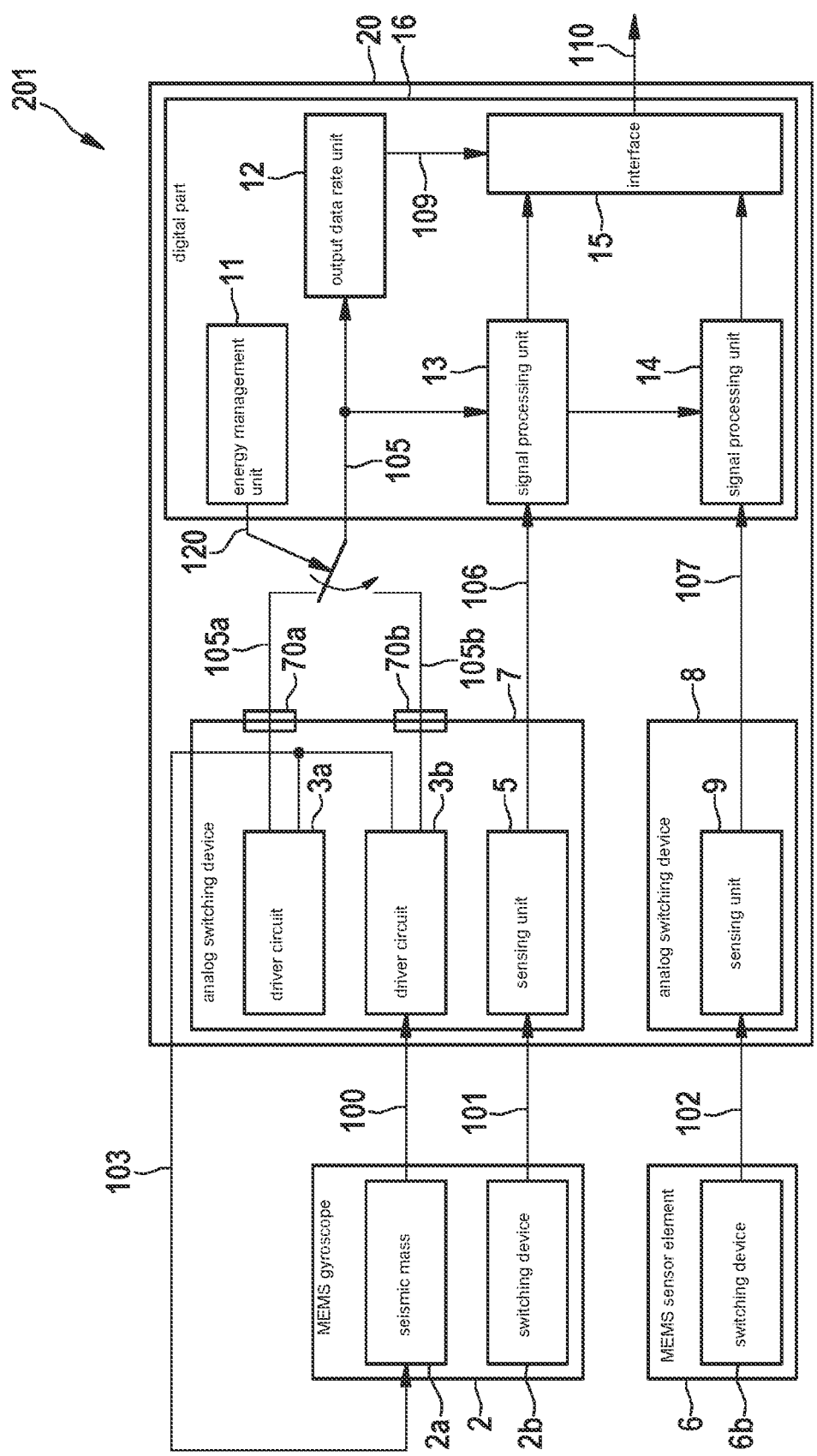
FIG. 3 shows a MEMS sensor array according to one further specific embodiment of the present invention.

FIG. 3 shows a MEMS sensor array 201 according to one further specific example embodiment of the present invention.

In contrast to MEMS sensor array 200 according to FIG. 2, instead of a single driver circuit 3, which is operable in two operating modes, separate driver circuits 3a, 3b for the different operating modes are situated in MEMS sensor array 201 according to FIG. 3, more precisely a low energy or stand-by driver circuit 3a and a high energy or sensing driver circuit 3b. Accordingly, position signal 100 of MEMS gyroscope 2 must be supplied to both driver circuits 3a, 3b. Driver signals 105a, 105b of the two driver circuits 3a and 3b are provided via separate interfaces 70a, 70b. The selection of the respective driver circuit 3a or 3b takes place together with the specification of an operating mode 3-1 for the gyroscope device by energy management unit 11, which accordingly activates a switch 120 downstream from interfaces 70a, 70b for this purpose.

In summary, at least one of the specific embodiments of the present invention yields at least one of the following advantages:

- lower energy consumption of the read-out circuit compared to known read-out circuits
- lower complexity of the MEMS system overall
- high accuracy and stability of the output data rate
- avoidance of jumps or settling phases during the switch between an additional oscillator as a clock generator and the gyroscope component as a clock generator for the entire sensor system.

Although the present invention has been described based on preferred exemplary embodiments, it is not limited thereto, but is modifiable in a variety of ways.

What is claimed is:

1. A sensor array, comprising:
   a gyroscope device configured to detect rotation rate sensor signals, including:
      a MEMS gyroscope including a seismic mass which is excitable to carry out oscillations,
      a driver circuit configured to excite and maintain an oscillating movement of the seismic mass, and
      a sensing unit;
   a control unit configured to select one of at least two different predefined operating modes of the gyroscope device, at least one sensing operating mode, in which rotation rate sensor signals are detected and/or preprocessed, and at least one stand-by operating mode, in which no rotation rate sensor signals are detected and/or preprocessed, being predefined as the operating modes;
   one further sensor device configured to detect further sensor signals; and
   a digital data processing unit configured to digitize the rotation rate sensor signals and the further sensor signals;
   wherein the driver circuit is operable, corresponding to the different operating modes of the gyroscope device, in different operating modes having different energy consumption so that the oscillating movement of the seismic mass is maintained in the at least one sensing operating mode and in the at least one stand-by operating mode; and
   wherein the output data rate of the digitized rotation rate sensor signals and of the digitized further sensor signals is based on an oscillation frequency of the seismic mass both in the at least one sensing operating mode and in the at least one stand-by operating mode.

2. The sensor array as recited in claim 1, wherein the control unit is configured to directly activate the sensing unit and/or the driver circuit of the gyroscope device, to specify an operating mode.

3. The sensor array as recited in claim 1, wherein the driver circuit is configured to provide the digital data processing unit with a clock signal including pieces of information about the oscillation frequency of the seismic mass.

4. The sensor array as recited in claim 1, wherein the driver circuit includes at least two separate driver circuits, using which different operating modes of the driver circuit are provided.

5. The sensor array as recited in claim 1, wherein the further sensor device includes a MEMS acceleration sensor, and/or a magnetometer, and/or a pressure sensor, and/or a gas sensor, and/or a moisture sensor.

6. A method for operating a sensor array, the sensor array including a gyroscope device configured to detect first sensor signals in the form of rotation rate sensor signals, the gyroscope device including a MEMS gyroscope including a seismic mass which is excitable to carry out oscillations, a driver circuit configured to excite and maintain an oscillating movement of the seismic mass, and a sensing unit, the sensor array further including a control unit configured to select one of at least two different predefined operating modes of the gyroscope device, at least one sensing operating mode, in which rotation rate sensor signals are detected and/or preprocessed, and at least one stand-by operating mode, in which no rotation rate sensor signals are detected and/or preprocessed, being predefined as the operating modes, a second sensor device configured to detect further sensor signals, and a digital data processing unit configured to digitize the rotation rate sensor signals and the further sensor signals, the method comprising:

operating the driver circuit, corresponding to the different operating modes of the gyroscope component, in different operating modes having different energy consumption, so that an oscillating movement of the seismic mass is maintained in at least one sensing operating mode and in at least one stand-by operating mode;

wherein the output data rate of the digitized rotation rate sensor signals and of the digitized further sensor signals is based on an oscillation frequency of the seismic mass both in the at least one sensing operating mode and in the at least one stand-by operating mode.

\* \* \* \* \*